United States Patent
Corson, Jr.

[11] 3,938,742
[45] Feb. 17, 1976

[54] CASCADE PLUG NOZZLE

[75] Inventor: Blake W. Corson, Jr., Newport News, Va.

[73] Assignee: The United States of America as represented by the United States National Aeronautics and Space Administration Office of General Counsel-Code GP, Washington, D.C.

[22] Filed: July 12, 1974

[21] Appl. No.: 488,616

Related U.S. Application Data

[63] Continuation of Ser. No. 331,759, Feb. 13, 1973, abandoned.

[52] U.S. Cl. .................. 239/265.11; 181/33 HC
[51] Int. Cl.² ........................................ B63H 11/00
[58] Field of Search..... 239/265.11, 265.13, 265.19, 239/265.25; 181/33 HC, 33 H, 33 HB

[56] References Cited
UNITED STATES PATENTS

| | | | |
|---|---|---|---|
| 1,493,157 | 5/1924 | Melot | 239/265.19 X |
| 2,866,316 | 12/1958 | Towle et al. | 239/265.25 |
| 2,995,200 | 8/1961 | Seifert | 181/33 HB |
| 3,441,218 | 4/1969 | Bucher | 239/265.13 X |
| 3,721,389 | 3/1973 | MacKinnon | 239/265.19 |

Primary Examiner—John J. Love
Attorney, Agent, or Firm—Howard J. Osborn; John R. Manning

[57] ABSTRACT

An exhaust nozzle for a jet aircraft provides jet noise suppression. The nozzle includes a plurality of coaxial airfoil ring segments which are spaced serially along the longitudinal axis of the nozzle to define a plurality of annular coaxial channels therebetween. The diameters of the segments progressively decrease downstream along this axis and the exits of the channels are non-coplanar. The radial depths of the channels are small as compared with the axial distance between adjacent channel exits so that noise is emitted non-simultaneously from the channel exits as a series of weakened pulses staggered in time. The boattail angles of the outer surfaces of the ring airfoil segments increase in magnitude with increasing distance downstream to reduce drag.

10 Claims, 5 Drawing Figures

CASCADE PLUG NOZZLE

ORIGIN OF THE INVENTION

The invention described herein was made by an employee of the United States Government and may be manufactured and used by or for the Government for governmental purposes without the payment of any royalties thereon or therefor.

This is a continuation of application Ser. No. 331,759 filed Feb. 13, 1973, now abandoned.

FIELD OF INVENTION

The present invention relates to jet engines and, more particularly, to a cascade plug nozzle for jet engine exhausts which lessens noise with a minimum loss of thrust.

BACKGROUND OF THE INVENTION

A large number and variety of jet engine exhaust nozzles have been provided which are concerned with the reduction or attenuation of the noise produced when the engine jet issues from the exhaust nozzle exit. In one type of jet noise suppressor, the nozzle exit is configured so that the ratio of jet periphery to jet cross sectional area is much larger than for a circle, the increased jet surface promoting rapid mixing of the jet with the surrounding air and thereby shortening the length of the mixing region, which is a source of noise. Jet noise suppressors of this type may be multilobed as a Greatrex nozzle, multitube nozzles, or slit nozzles.

A further type of jet noise suppressor involves acoustical treatment of the inside of the engine tail pipe and exhaust nozzle. This acoustical treatment involves locating sound absorbing material within the tail pipe and nozzle in regions where the flow velocity of the gas is relatively low so as to minimize the thrust loss due to fluid friction between the flowing gas and the acoustical material.

Another type of jet noise suppressing nozzle incorporates a more or less cylindrical shroud which surrounds the jet exit. The diameter of the shroud is greater than that of the jet exit so that external air flow may enter the open annulus between the jet and the leading edge of the shroud. The length of the shroud is typically about two jet diameters and the shroud forms a barrier surrounding the region of intense noise caused by mixing of the jet with the air induced into the shroud, and reduces radiated noise by acting as a barrier to radiation. The gas exiting from the shroud presents reduced noise problems since downstream of the shroud the jet velocity is reduced by mixing and thus further noise generation is accordingly reduced.

Each of the above proposals suffers disadvantages. In general, the most serious disadvantage of jet noise suppressors of the prior art is that such devices achieve a reduction in jet noise at the expense or cost of a related loss of thrust. An estimate of thrust loss for a typical installation is approximately one percent of nozzle ideal isentropic gross thrust for each decibel of noise reduction when compared with the noise and thrust performance of a conventional convergent or convergent-divergent exhaust nozzle.

More particularly, jet noise suppressors which depend on increasing the ratio of jet periphery to cross sectional area, such as lobe, multitube and slit types, inherently incorporate, within the nozzle, a relatively large surface in contact with the flowing exhaust gases and thereby incur excessive fluid friction losses. Such prior art suppressors generally include a large effective base or boattail area which cause excessive aerodynamic drag, and, therefore, an excessive loss of thrust. It will be appreciated that the shrouded jet type of noise suppressor referred to above produces very high drag except at low speeds, i. e., at speeds less than a Mach number of 0.30.

The disadvantages of what has been referred to as acoustical treatment type noise suppressors are of a different kind. In particular, the suppressors which depend on acoustical treatment of the inside of the tail pipe and nozzle produce minimum thrust loss. Firstly, there is a loss due to the fluid friction between the flowing exhaust gas and the acoustical material although this loss is relatively small. Further, and more importantly, this type of jet noise suppressor does not attenuate the noise generated downstream of the jet exit by the mixing of the jet with external air and hence fails to quell a critical source of jet noise.

A further disadvantage common to most jet noise suppressors of the prior art is that no deliberate attempt is made to break up the wave fronts of sound generated within the engine and tail pipe as each sound wave issues from the jet exit or exits. When, as for many prior art jet noise suppressors, the nozzle exits are more or less coplanar, it is noted that a sound wave front, normal to the nozzle axis of symmetry and moving toward the nozzle exit(s), will issue from all the nozzle exits simultaneously and recombine as a single strong pressure wave downstream of the exits. The aggregation of such waves of various frequencies constitute noise. It is pointed out that the character of the noise generated within the engine and tail pipe is not appreciably altered by systems employing a multiplicity of coplanar jet exits as the sound waves issue from the exhaust system into the surrounding atmosphere.

An additional disadvantage of prior art jet noise suppressors is that they are configured such that kinetic energy of the jet downstream of the jet exit or exits cannot be utilized to reduce drag. One exception to this statement is the shroud type noise suppressor referred to above which, at very low flight speeds, may utilize kinetic energy of the jet to provide some thrust augmentation. However, at speeds above about Mach No. 0.30, this thrust augmentation vanishes and at higher speeds the drag produced by the shroud becomes undesirably great.

The following patents disclose jet noise suppressors or silencers of general interest although this list is not, of course, represented as being in any way complete or exhaustive: U.S. Pat. No. 2,865,169 (Hausmann); U.S. Pat. No. 2,952,124 (Pearson); U.S. Pat. No. 3,069,048 (Griffith); U.S. Pat. No. 3,187,501 (Quick); and U.S. Pat. No. 3,463,402 (Langston, Jr.). Generally speaking, the jet noise suppressors disclosed in these patents suffer one or more of the disadvantages discussed above.

SUMMARY OF THE INVENTION

In accordance with the invention, a cascade plug nozzle for a jet propulsion aircraft is provided which attenuates a large part of the noise generated within the engine and tail pipe as well as a portion of the externally generated jet noise. Further, this noise reduction is accomplished with substantially less loss of thrust than is incurred with prior art jet noise suppressor nozzles.

According to a presently preferred embodiment thereof, the nozzle of the invention comprises a plurality of coaxial annular segments, preferably ring airfoils, spaced serially along the longitudinal axis, or axis of symmetry, of the nozzle so as to define a plurality of coaxial channels therebetween. The nozzle also includes an upstream lip segment and terminates in a downstream plug which is preferably of annular or conical shape. The diameters of the ring airfoils decrease progressively downstream along the longitudinal axis of the nozzle so that each segment is smaller in diameter than the preceding upstream segment and is larger in diameter than the next downstream segment. The channels defined by the ring airfoils have non-coplanar exits and the radial depths of these exits are small compared with the axial distance between the exits of adjacent channels, i.e., more precisely, the axial distance between the exit planes of adjacent channels normal to the longitudinal axis of the nozzle. With this latter arrangement, an intense internal sound pressure pulse, whose wave front is more or less normal to the axis of symmetry of the nozzle and which is travelling with the combined speed of the exhaust gas and the acoustic velocity inside the nozzle and tail pipe, will not be emitted simultaneously from all of the exits but will rather be emitted as a series of much weaker sound pulses, one from each of the annular channel exits, with an interval of time elapsing between the emitted pulses.

In accordance with a further important feature of the invention, the boattail angle of each of the outer surfaces of the ring airfoils, i.e., the angle between the outer surface viewed in longitudinal cross section and an intersecting line parallel to the axis of symmetry of the nozzle, is greater in magnitude than that of the outer airfoil surface upstream therefrom so that the reduced pressure caused by mixing of the external air with that part of the engine exhaust which issues from the first or most upstream channel will, in acting on the shallowly boattailed outer surface of the first ring airfoil segment, exert only a very small pressure drag on the cascade plug nozzle. Further, this reduced pressure will also impart a component of velocity directed toward the nozzle axis of symmetry so that the resulting converging external air flow will, on being redirected in an axial direction in the vicinity of the downstream segments of the nozzle, exert a positive pressure on these segments (which, as stated, have boattail angles relatively greater than those of the first segment) and will, therefore, exert a thrust on the downstream portions of the nozzle which opposes and, in fact, more than compensates for, the pressure drag on the first segment referred to above.

With the provision that the radial depth of the first or most upstream annular channel, i.e., that between the lip segment and the first ring airfoil segment, is small relative to the axial spacing between the first and second annular channel exits, the outermost annular jet initially forms a jet sheet bounded on its inner surface by the outer surface of the first ring airfoil segment. The jet sheet so produced is sufficiently thin to retard the natural increase, with time, of the amplitude of the jet surface waves generated by relative motion between the outer surface of the first annular jet and the contiguous ambient air.

In accordance with a further feature of the invention, sound absorbing material is mounted on the inner surfaces of the ring air foil segments to serve in attenuating noise generated and propagated within the region of the engine, tail pipe, and nozzle interior. Because of low velocity of flow at the inner surfaces of the ring airfoils, these surfaces serve as an ideal location for such material and enable mounting of the material without the need for any additional mounting structure within the nozzle or tail pipe.

These features, as well as other features not specifically enumerated here, will be discussed in more detail hereinbelow in considering a preferred embodiment of the invention.

PREFERRED EMBODIMENT DESCRIPTION

Figure 1:
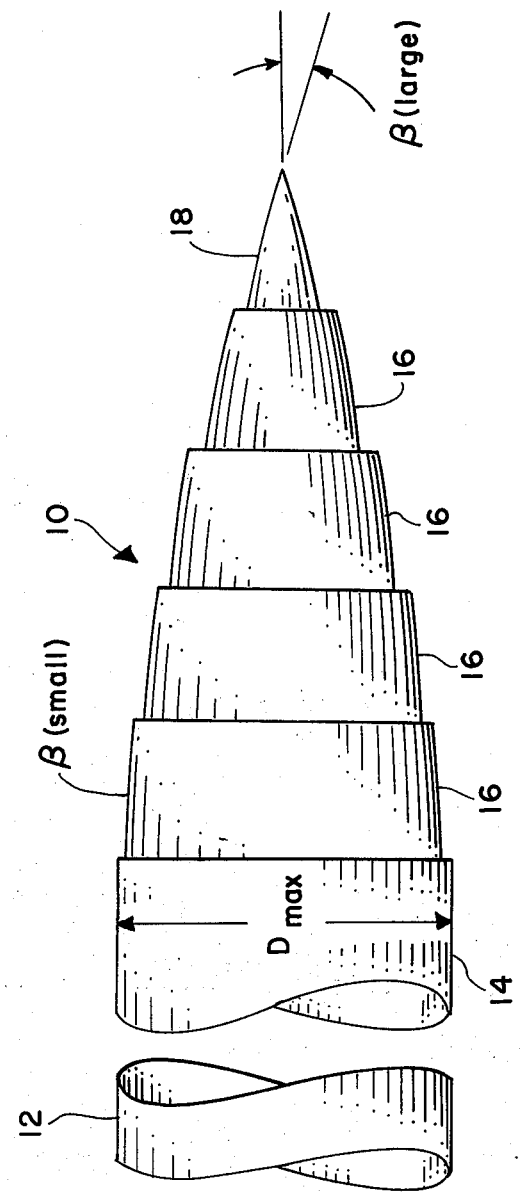
FIG. 1 is a diagrammatic side view of a cascade plug nozzle jet noise suppressor in accordance with a presently preferred embodiment of the invention.

Referring to FIG. 1 of the invention, one embodiment of a cascade plug nozzle is shown. It should be noted that because of the symmetry of the nozzle, FIG. 1 could be taken to be a bottom or top view as well as a side view. The nozzle, which is generally denoted 10, is secured to the engine tail pipe indicated diagrammatically at 12 and includes an initial lip segment 14, a plurality of ring airfoil segments 16, and a terminal plug 18. The lip segment 14, ring airfoil segments 16 and terminal plug 18 are arranged about the axis of symmetry of the nozzle 10 and spaced longitudinally to form a succession or "cascade" of annular nozzles or flow channels 20 each having an annular jet exit 22. The lip segment 14 may be more or less circular in cross section, taken normal to the axis of symmetry, whereas ring airfoil segments 16 are also more or less circular in cross section. As illustrated, each ring airfoil segment 16 is smaller in diameter than the preceding one, progressing from lip segment 14 to terminal plug 18.

Figure 2:
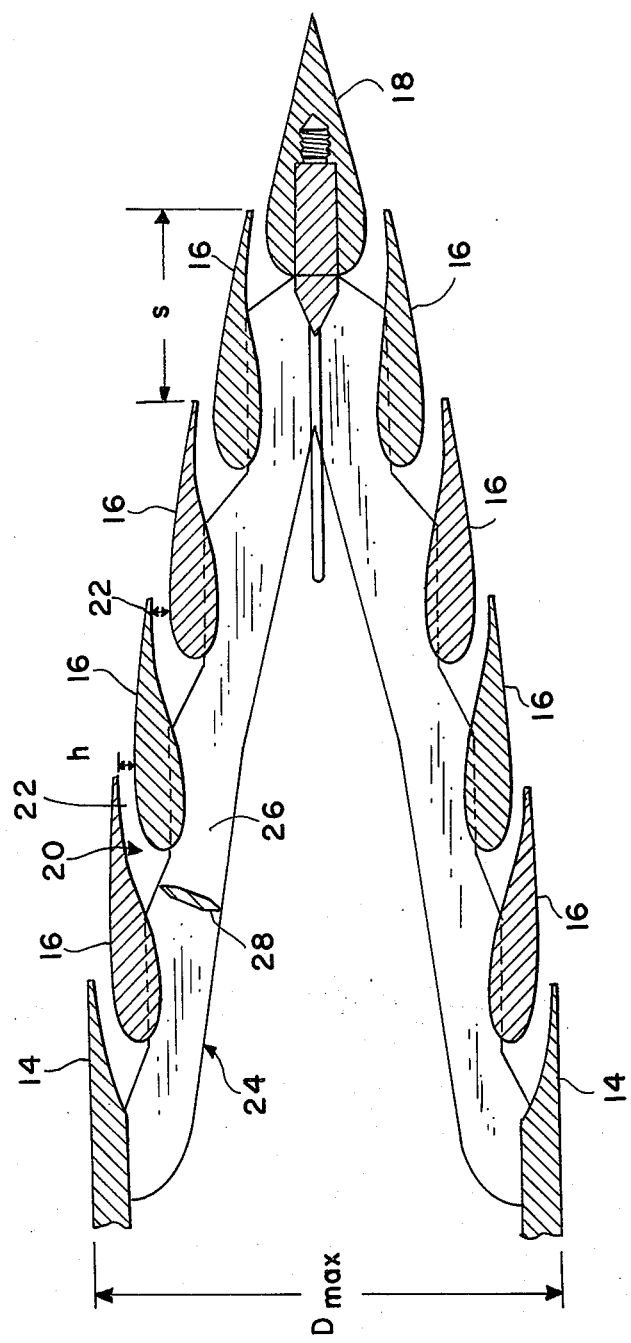
FIG. 2 is a longitudinal section view, to an enlarged scale, of the nozzle of FIG. 1.

As shown in FIG. 2, the ring airfoil segments 16 and terminal plug 18 are attached to, and held in proper position by, a spider 24 composed of a plurality of struts 26 having a cross section indicated at 28. The struts 26 of spider 24 are rigdly secured to the inside of initial lip segment 14 or to the downstream end of the engine tail pipe 12.

Figure 3:
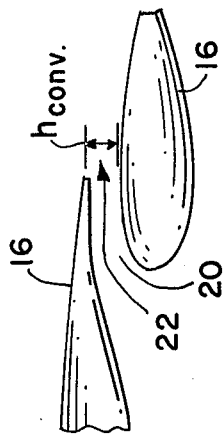
FIG. 3 is a detail of one of the jet passages shown in FIG. 2.
Figure 4:
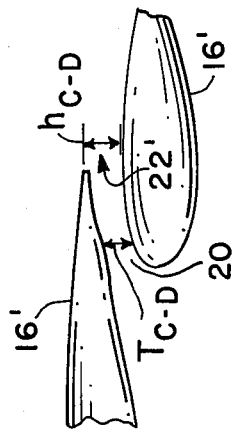
FIG. 4 is a detail similar to that of FIG. 3 illustrating an alternate embodiment.

As mentioned above, annular nozzle flow channels 20 are formed in the region bounded by the leading edge of the outer surface of one ring airfoil segment 16 and the trailing edge of the inner surface of the preceding segment, as illustrated in FIG. 2. Of course, two further such channels are formed between the lip 14 and the first (upstreammost) ring segment 16, and the last (downstreammost) ring segment 16 and plug 18. The cross sectional area of the flow passage provided by these channels may be convergent as illustrated in FIG. 2 and FIG. 3, or convergent-divergent as illustrated in FIG. 4.

Referring to FIG. 2, the longitudinal spacing between jet exits 22 is denoted $s$. This spacing between one annular exit 22 and the next downstream can be uniform or can be made non-uniform. The radial dimension of the annular jet exits 22 is denoted $h$ in FIG. 2 and is very much smaller than the spacing $s$. Further, the outer surface of the first ring airfoil 16, downstream from the first annular exit formed between the inner trailing edge surface of segment 14 and the outer leading edge surface of the first airfoil 16, should be substantially cylindrical or, stated differently, should have a very small "boattail" angle "$\beta$", e.g., preferably from 0° to 5° (See FIG. 1). As can perhaps can best be seen in FIG. 1, the boattail angle $\beta$ of segments 16 increases progressively downstream of the first segment 16.

Figure 5:
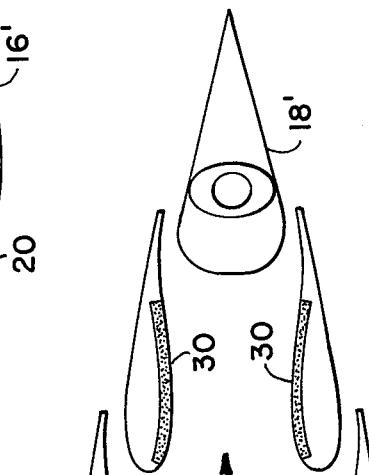
FIG. 5 is a simplified version of FIG. 2 used illustrating the operation of the nozzle of the invention, and incorporating acoustical treatment.

FIG. 5 will be referred to regarding certain background considerations as well as explaining the operation of the cascade nozzle of the invention. However, although FIG. 5 generally corresponds to a simplified version of the longitudinal section of FIG. 2, there is one feature of this embodiment which merits particular attention. Specifically, in this embodiment, the inner surfaces of the airfoil segments 16 are treated with an acoustical material as indicated at 30 as an aid in attenuating noise generated within the engine and tailpipe, and thereby of reducing the intensity of the internal noise issuing from the nozzle exits and radiated into the surrounding air. As mentioned above and discussed in more detail below, the inner surfaces of airfoil segments 16 provide internal flow passages for the engine exhaust gases wherein the flow velocity everywhere is much less than the jet velocity at the annular exits. Thus, these inner surfaces provide a nearly ideal location for the installation of sound absorbing material 30. As mentioned above, the use of acoustical absorbing material is not novel per se and a number of different known materials can be used. However, as previously discussed, the jet nozzle of the invention provides substantial advantages regarding location and, in this general regard, eliminates the need to provide additional structure within the tail pipe and nozzle to retain acoustical material in place as is required by conventional exhaust nozzles. A further difference between the embodiment of FIG. 5 and that of FIG. 2, is that a more or less ring-shaped plug 18' having a generally circular aperture therein replaces the conical plug of FIG. 1.

Considering the operation of the cascade plug nozzle 10 of the invention, reference is made to FIG. 5 and to the sound pressure pulse of plane wave front indicated by heavy dashed line A—A. The sound pressure pulse is assumed to have been generated upstream in the vicinity of the engine, and to be travelling downstream through the tailpipe with the combined velocity of the speed of sound, denoted $a_i$, and the velocity, denoted $v_i$, of the exhaust flow within the tail pipe and nozzle. A part of the sound pressure pulse will be emitted first from the first annular exit, denoted 22 in FIG. 5, and will radiate from that point into the surrounding atmosphere as is indicated by the dashed lines denoted Pl representing a first weakened sound pressure pulse. Another portion of the overall sound pressure pulse will be emitted at the next downstream annular exit 22$b$ and similarly radiated as indicated at P2, but there will be a time lag between these emitted weaker pulses as shown. The magnitude of the time lag, $\Delta t$, between pulses will be approximately:

$$\Delta t = \frac{s}{V_i + a_i}$$

The internal flow velocity, $V_i$, and speed of sound, $a_i$, may vary with axial distance within the tail pipe and nozzle, so that even though the values of axial spacing, denoted $s$, from one annular exit to the next may be equal, the values of time lag, $\Delta t$, may not be equal.

The axial flow velocity, $V_i$, within the tail pipe and nozzle is determined by the mass flow of the engine exhaust gases, the size of the tail pipe and nozzle internally, and the thermodynamic properties and state of the exhaust gases. A unique relation also exists between the foregoing factors and the total exit area of the exhaust nozzle which is the sum of the cross sectional areas of the individual annular exits. The axial variation of the exhaust gas flow velocity, $V_i$, within the cascade plug nozzle is determined in part by the axial location and size of the individual annular exits 22.

The burden of the foregoing discussion is that a single strong pressure pluse generated within the engine or tail pipe, will, through the action of wave front breakup, be emitted from a cascade plug nozzle 10 as a series of much weaker pressure pulses; and that an aggregation of strong pulses within the tail pipe 12, which constitute a loud noise internally, will be emitted from a cascade plug nozzle as a much less intense noise. Further, through choice of the sizes and axial spacing of the annular jet exits 22, and of the overall length of the cascade plug nozzle 10, it is to a certain extent within the discretion of the nozzle designer to control the duration of the time intervals between the emissions of the weakened sound pressure pulses, to make the intervals isochronous or anisochronous, and thereby to control the quality of the sound radiated from the cascade plug nozzle to the surrounding atmosphere.

An important feature of the invention is the reduction of external jet mixing noise. In general, the major portion of the noise generated by the operation of a jet engine or jet propulsive system arises from shearing between the high velocity propulsive jet and the air surrounding the aircraft. The classical concept is that mixing of the jet with the surrounding air products eddies in the mixing zone and that these eddies become sources of noise. One approach to the reduction of jet mixing noise has been to reduce jet velocity by the use of a larger engine with increased mass flow to maintain a required thrust. Another approach has been to promote jet mixing as rapidly as possible to shorten the length of the zone of intense mixing and noise, or as previously noted to promote rapid mixing within a shroud or other confined region. These approaches have succeeded in achieving a partial reduction of jet noise, but at considerable penalty of increased weight or degraded thrust performance.

It is believed that some of the jet mixing noise may be generated at the interface between the high velocity jet and the surrounding air by the formation of surface waves at the interface. In his treatise on Hydrodynamics, Article 232 of the sixth edition, Sir Horace Lamb deals with this problem which is related to the flapping of sails and flags in a breeze. Lamb shows that when a relative velocity exists between two contiguous masses of fluid the surface at their interface is unstable, waves travelling in the direction of the relative motion are formed at the interface, and the amplitude of the wave motion increases with time (and distance). While the wave contours move parallel to the plane of the undisturbed interface, the motion of the fluid particles which comprise the waves is for the most part normal to that plane. It is believed that such surface waves are formed at the interface of a propulsive jet and the surrounding atmosphere, and that noise is generated by the motions of the waves and of the fluid particles, and by the breaking of the waves when excessive amplitude makes them completely unstable.

In general, most propulsive jet exhaust systems, with or without noise suppressing devices, do not incorporate features which might restrain the formation and buildup of the jet surface waves. The cascade plug nozzle of the invention does, however, provide such a feature. Of the multiplicity of annular jets of exhaust gas issuing from the axial array of annular nozzle exits 22, only the jet from the first or most upstream annular exit, i.e., exit 22a in FIG. 5, comes into intimate contact with the surrounding atmosphere, and this jet to a great extent shields the remaining, inner jets from such contact. More specifically, the cascade plug nozzle is constructed so that the thickness, $h$, or radial dimension of the jet is small in comparison with the axial distance, $s$, to the next downstream annular exit, and $h$ is very small in comparison with the maximum diameter, $D_{max}$, of the nozzle. The most upstream or first annular jet then is in contact with the surrounding air on its outer surface, but the inner surface thereof is bounded by the solid outer surface of the first ring airfoil segment 16. The fact that the jet sheet is relatively thin and is bounded inwardly by a solid surface eliminates the opportunity for buildup of large transverse motion of the fluid particles within this flow. Jet surface waves will undoubtedly form, but the nature of the cascade nozzle design restrains the tendency of these waves to increase in amplitude with increasing distance downstream, and thereby keeps to a minimum the jet noise which would otherwise be generated by jet surface waves.

The restraint to the buildup in amplitude of the jet surface waves does not preclude the viscous mixing of the jet with the surrounding air. Jet noise generated in the eddies resulting from the mixing will not be eliminated by the cascade plug nozzle. However, this mixing process improves the aerodynamic performance of the cascade plug nozzle as discussed hereinbelow.

The thrust performance of any propulsive exhaust nozzle involves the ability of the nozzle to produce as much thrust as may be possible from a specified mass flow of engine exhaust gases at a specified thermodynamic state. The maximum thrust is presumed to be achieved when the static pressure of the exhaust gases at the nozzle exit is equal to the static pressure of the surrounding atmosphere, and when the exhaust gases do not incur friction losses or other changes of entropy in flowing through the exhaust nozzle. The foregoing value of thrust is defined as the ideal isentropic thrust, $F_i$. The thrust performance of an actual nozzle is frequently expressed as the ratio of actual gross thrust, $F$, to the ideal, ($F/F_i$). The effectiveness of a nozzle in propelling an aircraft in flight depends on the magnitude of thrust, $F$, diminished by the aerodynamic drag, $D$, of the nozzle. It is desirable to have the thrust-minus-drag as large as may be possible, that is to say, the nozzle drag should have the least possible value.

One drawback of the cascade plug nozzle of the invention is the unusually large surface area in contact with the flowing exhaust gases. However, the inner surfaces of the ring airfoil segments 16 are exposed to the gas flow inside the nozzle where the velocity is relatively low, and the fluid friction loss is, therefore, small. As the exhaust flow enters the converging annular passage 20 approaching a nozzle exit 22 the gas velocity increases. It is noted that these essential passages should be short and should converge rapidly to minimize friction losses, but that excessive curvature of the nozzle contours should also be avoided so that local supersonic flow entailing shock losses will not occur. Some fluid friction loss can be avoided by designing the spider struts 26 which support the ring airfoil segments to be located as much as possible in the low velocity flow region; the trailing edges of these struts should not extend into the converging annular passage 20 approaching the exits 22. The major portion of the fluid friction loss occurs on the outer surfaces of the ring airfoil segments 16 which are exposed to the annular exhaust jets whose velocity generally is near sonic or supersonic. The fluid friction loss represents a reduction of nozzle gross thrust, $F$, and is generally independent of aerodynamic drag associated with the external airflow past the aircraft. The fluid friction loss incurred by a cascade plug nozzle 10 is the penalty paid for the jet noise suppression. However, it should be emphasized that the fluid friction loss for a cascade plug nozzle is less than that incurred by many other types of noise suppressing exhaust nozzles.

As mentioned above, an important feature of the cascade plug nozzle of the invention is the provision that the boattail angle, $\beta$, of the outer surface of the first ring airfoil segment 16 be relatively shallow, typically varying from about zero at the first annular exit station to about 3° to 5° at the trailing edge of the first ring airfoil segment; and that the boattail angles of the outer surfaces of the other ring airfoil segments 16 increase progressively with axial distance downstream to a maximum boattail angle at the apex of the terminal plug 18, generally as illustrated in FIG. 1. The external flow in moving downstream past the first ring airfoil segment 16 will mix with, and be entrained by, the high velocity annular jet issuing from the first or most upstream annular jet exit (denoted 22a in FIG. 5). This entrainment of the external flow by the jet creates the effect of aerodynamic sinks distributed over the outer surface of the first ring airfoil segment 16, and a surface pressure less than ambient will exist in this region. Inasmuch as the boattail angles of the first ring airfoil segment 16 are specified to be small the reduced pressure in this region results in very little pressure drag. on the other hand this reduced pressure field exerts a force on the external flow which imparts to its fluid particles an increment of velocity directed toward the nozzle axis of symmetry. This phenomenon is frequently referred to as the "Coanda Effect". The external flow converges from all sides toward the nozzle axis of symmetry, and in being redirected axially while still in the vicinity of the nozzle, creates a positive pressure field in the jet flow over the downstream segments of the nozzle 10. Because the downstream segments 16 including the terminal plug 18 are specified to have relatively large boattail angles, the positive pressure field created in the jet and external flow in this region exerts a thrust on the downstream portions of the nozzle. Thus, the kinetic energy of the exhaust jet, which is normally lost in the wake, is utilized through the "Coanda Effect" and made to yield additional thrust.

As discussed above, the annular nozzle flow channel 20 as shown in FIG. 2, and in greater detail in FIG. 3, is a convergent nozzle; that is, the cross sectional area of the flow channel is least at the downstream end of the annular passage. A convergent type nozzle will, in general, operate with high efficiency at values of jet total pressure ratio up to the critical value (approximately 2.0), and will incur only a small loss at values of total pressure ratio of 4.0 to 6.0. For application at higher values of jet total pressure ratio the nozzle should be of the convergent-divergent type, as mentioned above and shown in FIG. 4. To provide a cascade plug nozzle with annular nozzles of the convergent-divergent type, the cross section of each annular flow channel must have a minimum value or throat ($T_{c-d}$) at a location upstream of the annular exit. The amount of divergence or increase in annular exit area relative to the minimum section must be adapted to a specified condition of operation.

Another alternative embodiment to a cascade plug nozzle might be the incorporation of a thrust reversing device. Several types of jet thrust reversers, already in commercial use, can be adapted for use with the cascade plug nozzle of the invention.

Although the invention has been described relative to exemplary embodiments thereof, it will be understood that other variations and modifications can be effected in these embodiments without departing from the scope and spirit of the invention.

What is claimed as new and desired to be secured by Letters Patent of the United States is:

1. A low drag exhaust nozzle for a jet aircraft which provides jet noise suppression comprising a plurality of coaxial annular segment means for sequencing the exit of exhaust gas sound wave pressure perturbations, enveloping the majority of exhaust gases in a thin exhaust gas jet layer, and converting the kinetic energy of the exhaust jet into a forward, drag-reducing thrust component, wherein said coaxial annular segments are spaced serially along the longitudinal axis of the nozzle, the diameters of said annular segments progressively decreasing downstream along said axis so that each segment is smaller in diameter than the preceding upstream segment and is larger in diameter than the subsequent downstream segment, each of said annular segments overlapping both the preceding upstream annular segment and the subsequent downstream annular segment for overlapping lengths which are small compared to the axial length of said annular segments, and said overlapping lengths defining a plurality of coaxial channels therebetween having noncoplanar exits, the length of each of said channels being small compared with the axial length of said annular segments defining said channels and the radial depth of at least the first, most upstream channel being small compared with the axial distance between the exits of said first channel and the next downstream channel and the boattail angle between the external surface of the most upstream annular segment and the longitudinal axis of the nozzle is less than 10°.

2. An exhaust nozzle as claimed in claim 1 wherein the radial depth of each said channel is small as compared with the axial distance between the channel exits.

3. An exhaust nozzle as claimed in claim 2 wherein said annular segments comprise ring airfoils.

4. An exhaust nozzle as claimed in claim 1 wherein an acoustic absorbing material is located on the inner surfaces of said coapial annular segment.

5. An exhaust nozzle as claimed in claim 1 wherein said channels are of converging shape in cross section.

6. An exhaust nozzle as claimed in claim 1 wherein said channels are of converging-diverging shape in cross section.

7. An exhaust nozzle for a jet aircraft which provides jet noise suppression comprising a plurality of coaxial annular segments spaced serially along the longitudinal axis of the nozzle, the diameters of said annular segments progressively decreasing downstream along said axis so that each segment is smaller in diameter than the preceding upstream segment and is larger in diameter than the subsequent downstream segment, each of said annular segments overlapping both the preceding upstream annular segment and the subsequent downstream annular segment for overlapping lengths which are small compared to the axial length of said annular segments, and said overlapping lengths defining a plurality of coaxial channels therebetween having noncoplanar exits, the length of each of said channels being small compared with the axial length of said annular segments defining said channels and the radial depth of at least the first, most upstream channel being small compared with the axial distance between the exits of said first channel and the next downstream channel, wherein the boattail angles of the outer surfaces of the annular segments increase in magnitude progressively with downstream distance.

8. An exhaust nozzle for a jet aircraft which provides jet noise suppression comprising a plurality of coaxial annular segments spaced serially along the longitudinal axis of the nozzle, the diameters of said annular segments progressively decreasing downstream along said axis so that each segment is smaller in diameter than the preceding upstream segment and is larger in diameter than the subsequent downstream segment, each of said annular segments overlapping both the preceding upstream annular segment and the subsequent downstream annular segment for overlapping lengths which are small compared to the axial length of said annular segments, and said overlapping lengths defining a plurality of coaxial channels therebetween having noncoplanar exits, the length of each of said channels being small compared with the axial length of said annular segments defining said channels and the radial depth of at least the first, most upstream channel being small compared with the axial distance between the exits of said first channel and the next downstream channel, and further comprising an upstream lip segment located upstream of the most upstream annular segment and a terminating plug segment located downstream of the most downstream annular segment.

9. An exhaust nozzle as claimed in claim 8 wherein said plug segment is generally conical in shape.

10. An exhaust nozzle as claimed in claim 8 wherein said plug segment includes a central opening.

* * * * *